United States Patent
Lim

(10) Patent No.: US 9,567,527 B2
(45) Date of Patent: Feb. 14, 2017

(54) ALIGNMENT LAYER AND LIQUID CRYSTAL DISPLAY INCLUDING THE SAME

(71) Applicant: Samsung Display Co., Ltd., Yongin (KR)

(72) Inventor: Ho Lim, Suwon-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/644,536

(22) Filed: Mar. 11, 2015

(65) Prior Publication Data
US 2016/0109762 A1   Apr. 21, 2016

(30) Foreign Application Priority Data
Oct. 21, 2014   (KR) ........................ 10-2014-0142527

(51) Int. Cl.
*C09K 19/00*   (2006.01)
*C09K 19/56*   (2006.01)
(Continued)

(52) U.S. Cl.
CPC ......... *C09K 19/56* (2013.01); *G02F 1/133711* (2013.01); *G02F 1/133788* (2013.01);
(Continued)

(58) Field of Classification Search
CPC .............. G02F 1/1337; G02F 1/133711; G02F 1/13378; G02F 1/133784; G02F 2001/133726; G02F 2001/133397; C09K 19/56; Y10T 428/10; Y10T 428/1005
(Continued)

(56) References Cited

U.S. PATENT DOCUMENTS

2004/0138394 A1* 7/2004 Buchecker ........ G02F 1/133788
526/303.1

FOREIGN PATENT DOCUMENTS

KR     10-1212135 B1   12/2012
KR   10-2013-0029385 A    3/2013
(Continued)

*Primary Examiner* — Ruiyun Zhang
(74) *Attorney, Agent, or Firm* — Robert E. Bushnell, Esq.

(57) ABSTRACT

The present invention provides an alignment layer including a backbone including a polyolefin-based compound, and a plurality of side chains including a vertical functional group and a reactive mesogen (RM) and connected to the backbone, the backbone and the plurality of side chains include a compound represented by the following Chemical Formula 1, and a liquid crystal display including the alignment layer. According to the present invention, the alignment layer may have improved mechanical properties and afterimage by including a polyolefin-based compound as a backbone.

[Chemical Formula 1]

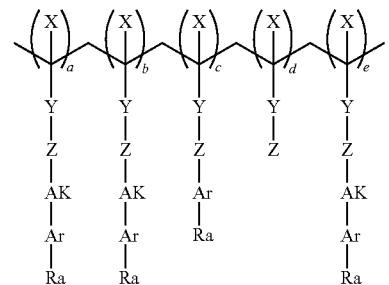

Wherein X, Y, Z, Ak, Ar, Ra, and a, b, c, d and e are defined as in the specification.

13 Claims, 6 Drawing Sheets

(51) Int. Cl.
*G02F 1/1337* (2006.01)
*G02F 1/1333* (2006.01)

(52) U.S. Cl.
CPC ............ *G02F 2001/133397* (2013.01); *G02F 2001/133726* (2013.01); *G02F 2001/133742* (2013.01); *Y10T 428/10* (2015.01); *Y10T 428/1005* (2015.01)

(58) Field of Classification Search
USPC ........... 428/1.1, 1.2; 349/123, 127; 264/451; 526/313, 317, 318, 318.1
See application file for complete search history.

(56) References Cited

FOREIGN PATENT DOCUMENTS

| | | |
|---|---|---|
| KR | 10-1300726 B1 | 8/2013 |
| KR | 10-2014-0034082 A | 3/2014 |

\* cited by examiner (a)

(b)

ALIGNMENT LAYER AND LIQUID CRYSTAL DISPLAY INCLUDING THE SAME

CLAIM OF PRIORITY

This application makes reference to, incorporates into this specification the entire contents of, and claims all benefits accruing under 35 U.S.C. §119 from an application ALIGNMENT LAYER AND LIQUID CRYSTAL DISPLAY INCLUDING THE SAME earlier filed in the Korean Intellectual Property Office on Oct. 21, 2014 and there duly assigned Serial No. 10-2014-0142527.

BACKGROUND OF THE INVENTION

Field of the Invention

The present invention relates to an alignment layer and a liquid crystal display including the alignment layer, and more specifically, to an alignment layer including polyolefin and a reactive mesogen, and a liquid crystal display including the alignment layer.

Description of the Related Art

A liquid crystal display, which is one of the most widely used flat panel displays at present, includes two sheets of display panels on which electric field generating electrodes such as a pixel electrode and a common electrode, and the like, are disposed and a liquid crystal layer interposed therebetween. The liquid crystal display displays an image by applying a voltage to the electric field generating electrodes to generate an electric field on the liquid crystal layer and consequently, determining a direction of liquid crystal molecules of the liquid crystal layer and controlling polarization of incident light.

Among the liquid crystal displays, a vertically aligned (VA) mode liquid crystal display in which a major axis of the liquid crystal molecule is arranged to be vertical to upper and lower display panels in a state in which an electric field is not applied is being spotlighted due to a large contrast ratio and a wide reference viewing angle.

In order to implement a light viewing angle in the vertically aligned (VA) mode liquid crystal display, a plurality of domains in which an alignment direction of the liquid crystal is different may be formed in one pixel.

The vertically aligned (VA) mode liquid crystal display has side visibility lower than front visibility, and in order to solve this problem, a method in which one pixel is divided into two sub-pixels and the two sub-pixels have different voltage is suggested.

Meanwhile, in order to implement light viewing angle and to have a rapid response speed of the liquid crystal, a method of adding a reactive mesogen to an alignment layer or the liquid crystal layer so that the liquid crystal has a pretilt is developing.

The above information disclosed in this background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an alignment layer and a liquid crystal display including the alignment layer having advantages of having excellent mechanical properties and improved afterimage by including a polyolefin-based backbone.

An exemplary embodiment of the present invention may provide an alignment layer including a backbone including a polyolefin-based compound, and a plurality of side chains connected to the backbone, wherein the backbone and the plurality of side chains may include a compound represented by the following Chemical Formula 1:

[Chemical Formula 1]

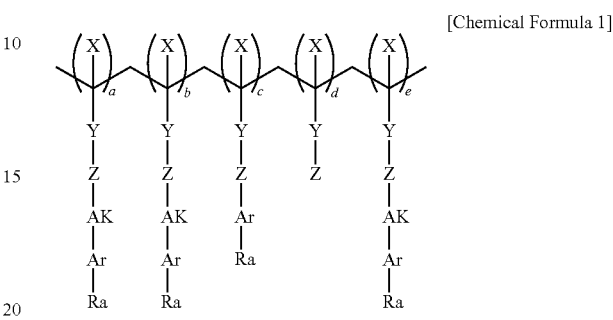

In Chemical Formula 1, X may independently include at least one of H and —$CH_3$, Y may independently include at least one of

O, and

Z may independently include at least one of OH, O,

$OCH_3$, and $O(CH)_nCH_3$, AK may independently include at least one of $(CH_2)_nO$,

and $(CH_2)_nCH_2$, Ar may independently include at least one of

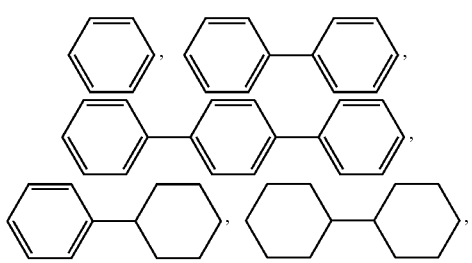

-continued

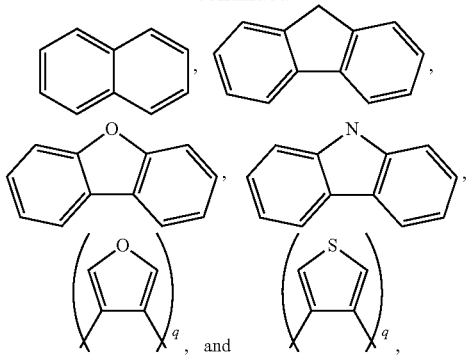

Ra may independently include at least one of

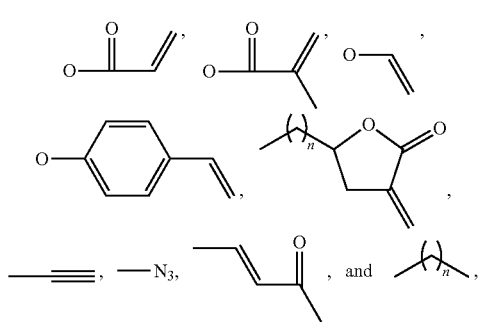

n may be 0 to 20, and q may be 1 to 4, and a, b, c, d and e may represent a component ratio of repeating units respectively, and may have a value of 0 to 100% respectively, the sum of the component ratio of a, b, c, d and e may be 100%.

According to one embodiment of the present invention, the compound represented by Chemical Formula 1 may be a compound represented by the following Chemical Formula 2:

[Chemical Formula 2]

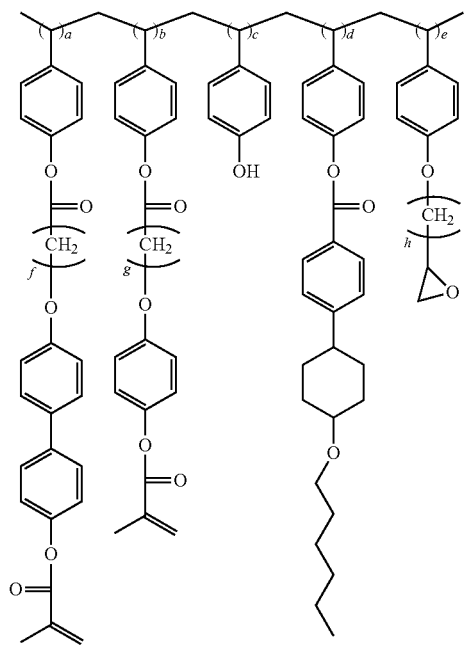

In Chemical Formula 2, f and g may be 4 to 8, and h may be 1 to 5, and a, b, c, d and e may be the same as defined above.

According to one embodiment of the present invention, in Chemical Formula 2, a and b may be 0.1, respectively, c may be 0.4, d may be 0.2, and e may be 0.2.

Another embodiment of the present invention may provide a method of manufacturing an alignment layer, the method may include forming the alignment layer on at least one of a first substrate and a second substrate facing each other and including an electric field generating electrode; and injecting a liquid crystal layer between the first substrate and the second substrate, wherein the alignment layer may be manufactured by the following Reaction Formula 1:

[Reaction Formula 1]

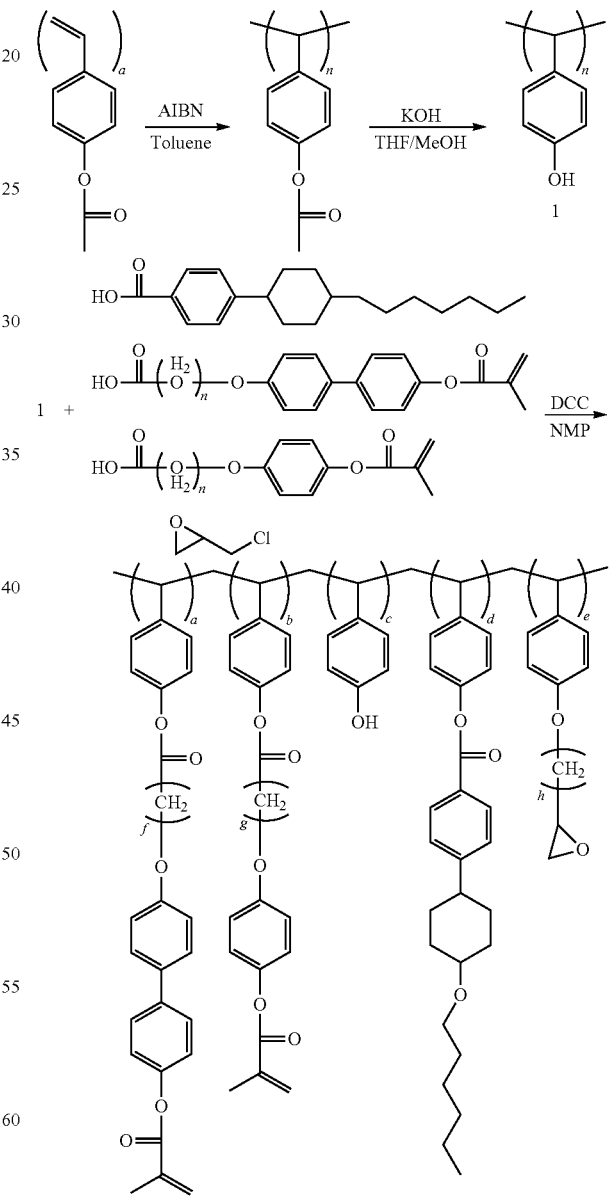

In Reaction Formula 1, f and g may be 4 to 8, and h may be 1 to 5, and a, b, c, d and e may be the same as defined above.

According to one embodiment of the present invention, the method may further include, after the injecting of the liquid crystal layer, applying a voltage to the electric field generating electrode; and irradiating light to the first substrate and the second substrate.

According to one embodiment of the present invention, in Reaction Formula 1, a and b may be 0.1, respectively, c may be 0.4, d may be 0.2, and e may be 0.2.

Yet another embodiment of the present invention may provide a liquid crystal display including: a first substrate, a second substrate facing the first substrate; a pixel electrode positioned on the first substrate; a common electrode positioned on the first substrate or the second substrate; a first alignment layer positioned on the first substrate; a second alignment layer positioned on the second substrate; and a liquid crystal layer positioned between the first substrate and the second substrate, wherein at least one of the first alignment layer and the second alignment layer may include an alignment polymer, and the alignment polymer may be formed from an alignment agent including a backbone including a polyolefin-based compound and side chains connected to the backbone, the side chain may include a vertical functional group and a reactive mesogen (RM), and the alignment agent may include a compound represented by the following Chemical Formula 1:

[Chemical Formula 1]

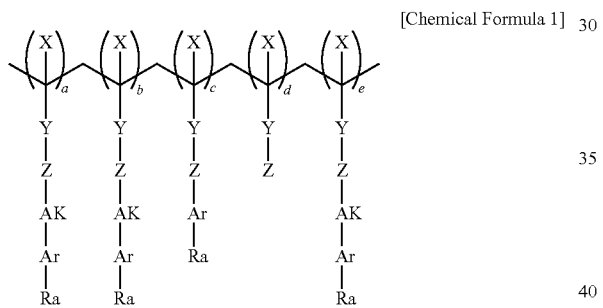

In Chemical Formula 1, X may independently include at least one of H and —$CH_3$, Y may independently include at least one of

O, and

Z may independently include at least one of OH, O,

$OCH_3$, and $O(CH)_nCH_3$, AK may independently include at least one of $(CH_2)_nO$,

and $(CH_2)_nCH_2$, Ar may independently include at least one of

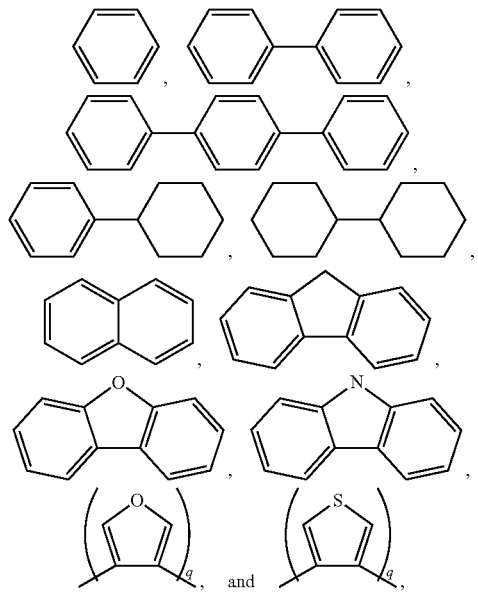

and

Ra may independently include at least one of

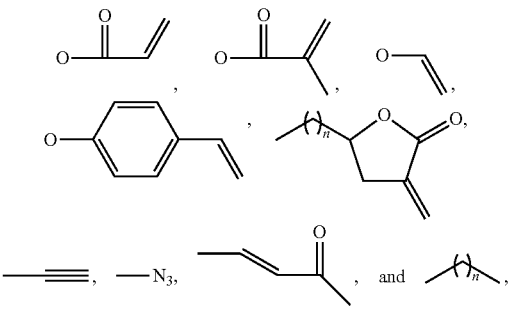

n may be 0 to 20, and q may be 1 to 4, and a, b, c, d and e may represent a component ratio of repeating units respectively, and may have a value of 0 to 100% respectively, the sum of the component ratio of a, b, c, d and e may be 100%.

According to one embodiment of the present invention, liquid crystal molecules of the liquid crystal layer may have a pretilt formed by the first alignment layer and the second alignment layer.

Yet another embodiment of the present invention may provide a method of manufacturing a liquid crystal display, the method may include forming a pixel electrode on a first substrate; forming a common electrode on the first substrate or a second substrate facing the first substrate; and forming a first alignment layer on the first substrate and a second alignment layer on the second substrate, respectively, wherein at least one of the first alignment layer and the second alignment layer is manufactured by the following Reaction Formula 1:

[Reaction Formula 1]

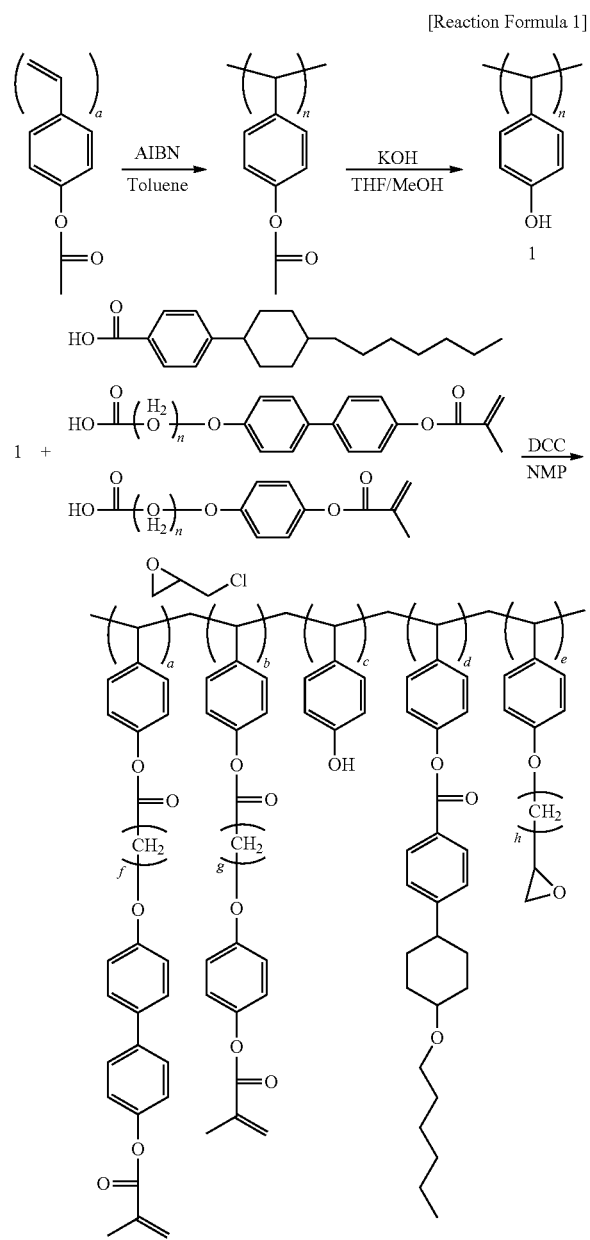

According to one embodiment of the present invention, in Reaction Formula 1 f and g may be 4 to 8, and h may be 1 to 5, and a, b, c, d and e may be the same as defined above.

According to one embodiment of the present invention, the method may further include, after the forming of the alignment layers, injecting a liquid crystal layer between the first substrate and the second substrate, applying a voltage to an electric field generating electrode; and irradiating light to the first substrate and the second substrate.

According to an embodiment of the present invention, the alignment layer may have improved mechanical properties and afterimage by including a polyolefin-based compound as a backbone.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
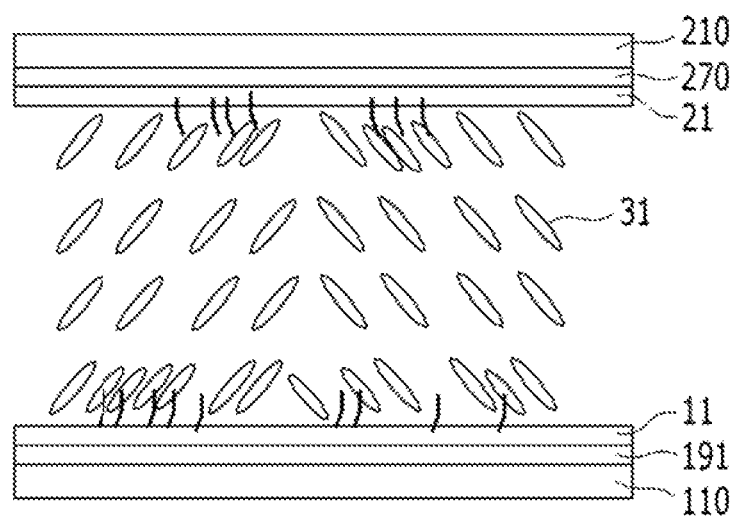
FIG. 1 is a cross-sectional view showing a process in which liquid crystal molecules have a pretilt by using an alignment layer including a photoreactor according to an embodiment of the present invention.

The present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
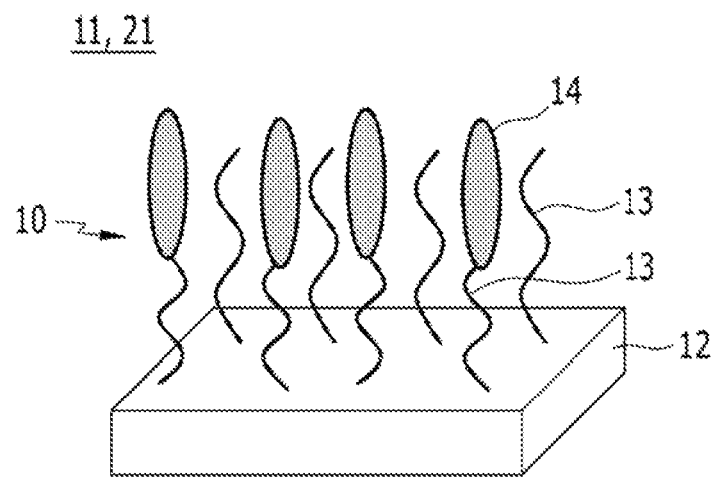
FIG. 2 is a diagram showing a structure of an alignment layer according to an exemplary embodiment of the present invention.

First, referring to FIGS. 1 to 2, alignment layers 11 and 21 according to an exemplary embodiment of the present invention, and an alignment method using the alignment layers 11 and 21 so that liquid crystal molecules 31 have a pretilt may be described.

FIG. 1 is a cross-sectional view showing a process in which liquid crystal molecules have a pretilt by using an alignment layer including a photoreactor according to an exemplary embodiment of the present invention, and FIG. 2 is a diagram showing a structure of an alignment layer according to an exemplary embodiment of the present invention.

First, referring to FIG. 1, the alignment layers 11 and 21 including alignment materials may be formed on two substrates 110 and 210. Here, the alignment layers 11 and 21 may include a backbone and a plurality of side chains connected to the backbone.

Referring to FIG. 2, each of the plurality of side chains may include a reactive mesogen (RM) 10 including a photoreactor 14, a vertical functional group 13 connected to a backbone 12, and the like. The reactive mesogen 10 may include one or more photoreactors 14. Even though FIG. 2 shows that the reactive mesogen 10 includes one photoreactor 14, which is shown for convenience, in fact, the photoreactor 14 may be one or more.

After the alignment layers 11 and 21 including an alignment agent are formed on the substrates 110 and 210 as described above, a data voltage may be applied to a pixel electrode 191 of a lower display panel 110, and a common voltage may be applied to a common electrode 270 of an upper display panel 210, thereby generating an electric field in a liquid crystal layer including the liquid crystal molecules 31 between two display panels 110 and 210. Then, the liquid crystal molecules 31 may respond to the electric field to be tilted in a direction in parallel to a length direction of fine branch portions (194a, 194b, 194c, and 194d in FIG. 7) formed in the pixel electrode 191. Here, the total number of directions in which the liquid crystal molecules 31 are tilted in one pixel may be four.

When the electric field is generated in the liquid crystal molecules 31 and light such as ultraviolet rays, or the like, may be irradiated, the photoreactors 14 included in the reactive mesogen 10 may react with each other to form an alignment polymer, and the polymer may control the pretilt which is an initial alignment direction of the liquid crystal molecules 31.

Hereinafter, the alignment layers 11 and 21 according to an exemplary embodiment of the present invention are described in more detail.

The alignment layers 11 and 21 according to an exemplary embodiment of the present invention may include a backbone 12, and a plurality of side chains connected to the backbone 12, which is primarily described.

The backbone 12 of the alignment layers 11 and 21 according to an exemplary embodiment of the present invention may include a polyolefin-based compound.

Referring to FIG. 2, the plurality of side chains may include a vertical functional group 13 or the reactive mesogen 10 including the photoreactor 14 connected to the vertical functional group 13. That is, a portion of the plurality of side chains may include the only vertical functional group 13, and a remaining portion of the plurality of side chains may be the reactive mesogen 10 including one or more photoreactors 14 connected to the vertical functional group 13.

The photoreactor 14 included in the reactive mesogen 10 may be connected to one side of the vertical functional group 13 in various forms, and therefore, a method in which the photoreactor 14 is connected to the vertical functional group 13 is not limited thereto.

The alignment layers 11 and 21 including the reactive mesogen 10 may include a polyolefin-based compound represented by the following Chemical Formula 1, and the side chains in addition to the backbone 12 may include the vertical functional group 13 and the photoreactors 14 connected to the vertical functional group 13.

[Chemical Formula 1]

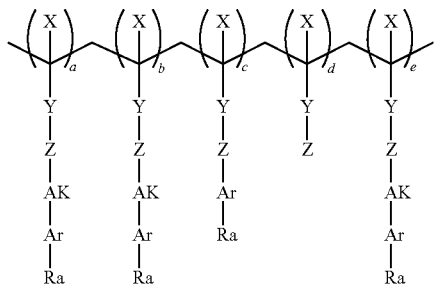

In Chemical Formula 1, X may independently include at least one of H and —$CH_3$, Y may independently include at least one of

O, and

Z may independently include at least one of OH, O,

$OCH_3$, and $O(CH)_nCH_3$, AK may independently include at least one of $(CH_2)_nO$,

and $(CH_2)_nCH_2$, Ar may independently include at least one of

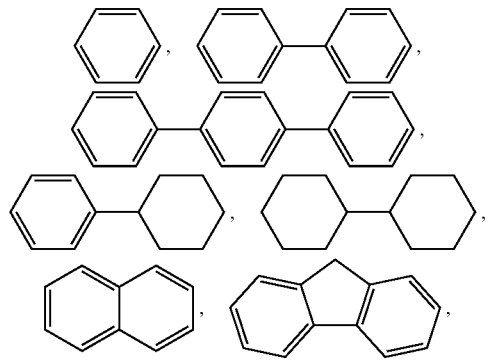

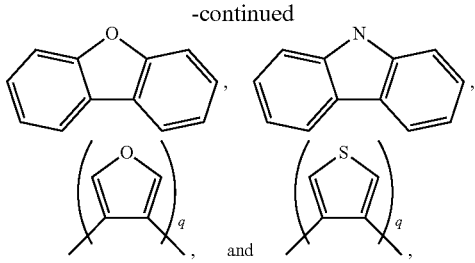

and Ra may independently include at least one of

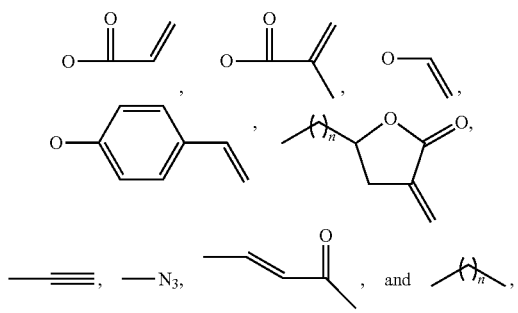

a, b, c, d and e, which represent a component ratio of repeating units, may have a value of 0 to 100%, respectively, and when expressing a, b, c, d and e as a ratio rather than a percentage, the sum total may be 1, and each may have a value of 0 to 1. n may be any one of 0 to 20, and q may be any one of 1 to 4.

According to one embodiment of the present invention, the Chemical Formula 1 by the above-described combination may be a compound represented by the following Chemical Formula 2:

[Chemical Formula 2]

According to one embodiment of the present invention, in Chemical Formula 2, a, b, c, d and e, which represent a component ratio of repeating units, may have a value of 0 to 100%, respectively, and when expressing a, b, c, d and e as a ratio rather than a percentage, the sum total may be 1, and each has a value of 0 to 1. In addition, f and g may be 4 to 8, and h may be 1 to 5.

According to one embodiment of the present invention, in Chemical Formula 2, a and b may be 10%, respectively, c may be 40%, d may be 20%, and e may be 20%, but the present invention is not limited thereto.

The compound represented by Chemical Formula 2 may be formed by the following Reaction Formula 1

[Reaction Formula 1]

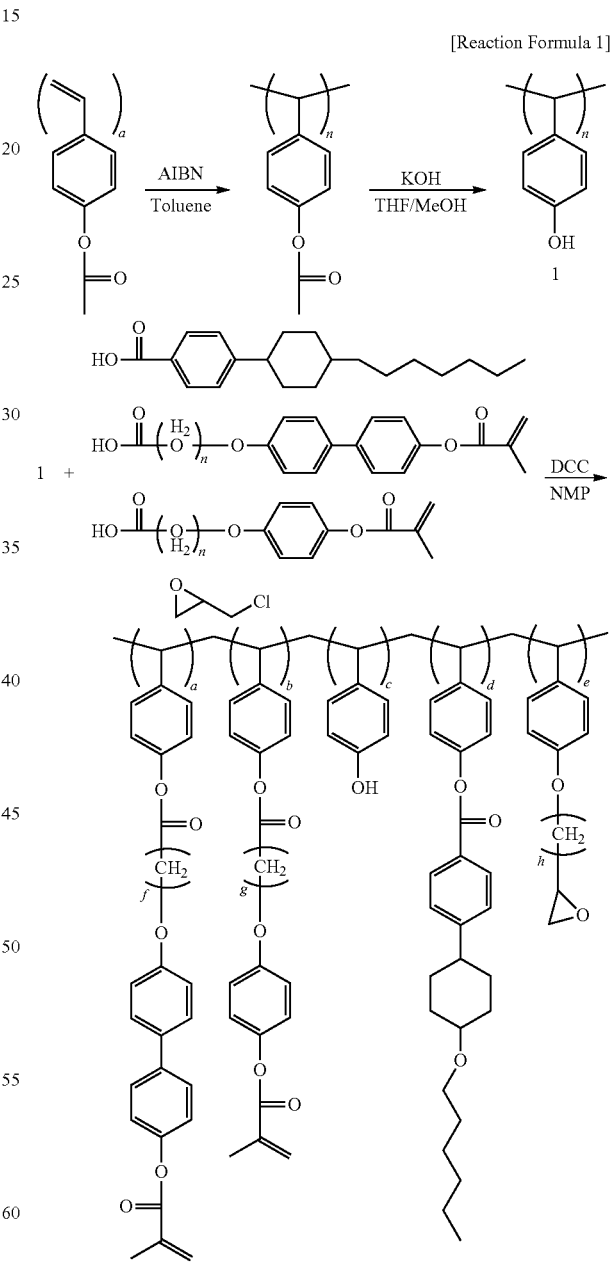

According to one embodiment of the present invention, in Reaction Formula 1, a, b, c, d and e, which represent a component ratio of repeating units, may have a value of 0 to 100%, respectively, and when expressing a, b, c, d and e as a ratio rather than a percentage, the sum total may be 1, and each has a value of 0 to 1. f and g may be 4 to 8, and h may be 1 to 5.

According to one embodiment of the present invention, in Reaction Formula 1, a and b may be 10%, respectively, c may be 40%, d may be 20%, and e may be 20%, but the present invention is not limited thereto.

When considering main role of each portion in the compounds represented by Chemical Formulae 1 and 2, a first side chain portion and a second side chain portion in sequence from left in the compounds represented by Chemical Formulae 1 and 2, which are components corresponding to the reactive monomer, may serve to control a pretilt of the liquid crystal by photopolymerization, and a third side chain portion may serve to improve a cross-linkage reaction and solubility, and a fourth side chain portion, which is a vertical alignment component, may serve to induce vertical alignment of the liquid crystal, and a fifth side chain portion may serve as a cross-linkage reaction.

When the polyolefin-based compounds represented by Chemical Formulae 1 and 2 are used in the alignment layers 11 and 21, a molecular weight may be increased and a polymerization reaction may be easily performed as compared to a polyimide-based compound generally used in the alignment layers, and therefore, various side chains may be capable of being introduced, thereby increasing density of the side chains of the alignment layers 11 and 21 approximately two times. Therefore, the alignment layers 11 and 21 may have high molecular weight and density and cross-linking groups may be easily introduced into the alignment layers 11 and 12, such that mechanical properties of the alignment layers 11 and 12 may be improved.

An image sticking and a black image sticking may occur since when a polymer in which a pretilt is formed has low modulus, the polymer may deviate from an originally formed pretilt and may be easily moved. However, the liquid crystal display according to an exemplary embodiment of the present invention includes the polyolefin-based compound represented by Chemical Formulae 1 and 2 as the alignment layers 11 and 21, such that the modulus becomes increased, and the increase in modulus of the polymer allows the pretilt formed during the process of applying a voltage and irradiating light to be more firmly fixed, and does not allow the pretilt previously formed by external condition to be changed. Accordingly, the black image sticking and the image sticking of the alignment layer may be improved.

Experimental results of an afterimage level of the liquid crystal display to which the alignment layers according to an exemplary embodiment of the present invention are applied may be described with reference to FIG. 3.

Figure 3:
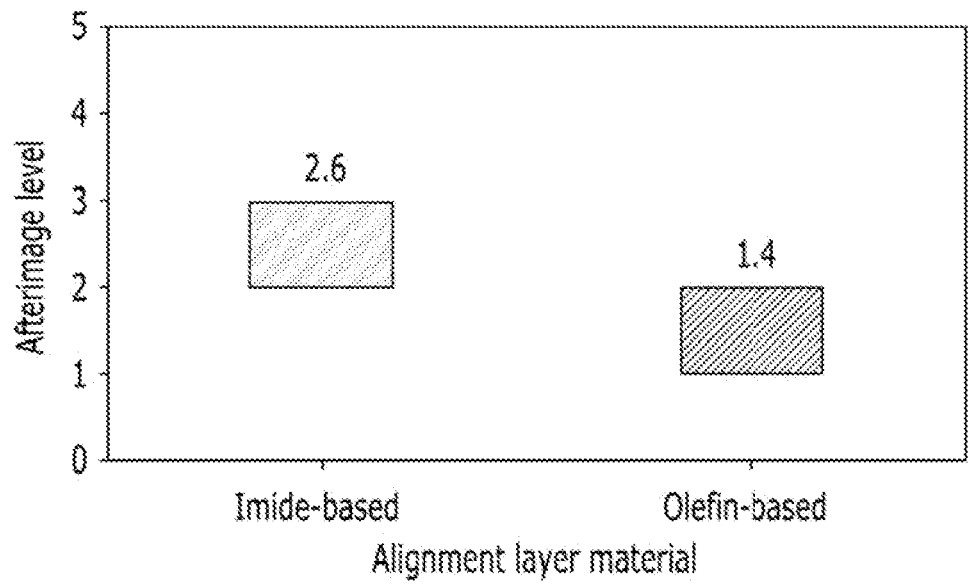
FIG. 3 is graphs showing experimental result of an afterimage degree of a liquid crystal display including alignment layers according to an exemplary embodiment of the present invention.
Figure 3:
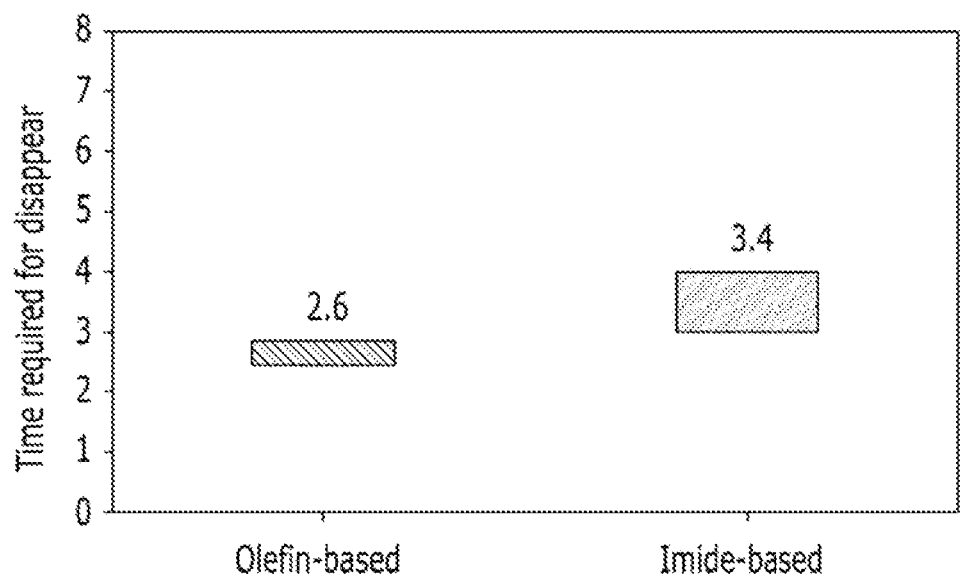

FIG. 3 is graphs showing experimental result of an afterimage degree of a liquid crystal display including alignment layers according to an exemplary embodiment of the present invention.

As Experimental Example, degree of the black image sticking and the image sticking of the alignment layers including the polyolefin-based compound represented by Chemical Formulae 1 and 2 according to an exemplary embodiment of the present invention may be measured by using a liquid crystal display including an alignment layer including a polyimide-based compound as a Comparative Example.

FIG. 3($a$) shows a degree of the black image sticking, and FIG. 3($b$) shows a degree of the image sticking.

As shown in FIG. 3($a$), in the black image sticking, the polyimide-based alignment layer may have 2.6 seconds; meanwhile, the polyolefin-based alignment layer may have 1.4 seconds, and therefore, it could be confirmed that the afterimage may be improved, and as shown in FIG. 3($b$), in the image sticking, the polyimide-based alignment layer may have 3.4 seconds; meanwhile, the polyolefin-based alignment layer may have 2.6 seconds, and therefore, it could be confirmed that the afterimage may be improved.

That is, it could be confirmed that the alignment layer including the polyolefin-based compound according to an exemplary embodiment of the present invention may have excellent afterimage improvement as compared to the alignment layer including the polyimide-based compound which is generally used in the art.

Figure 4:
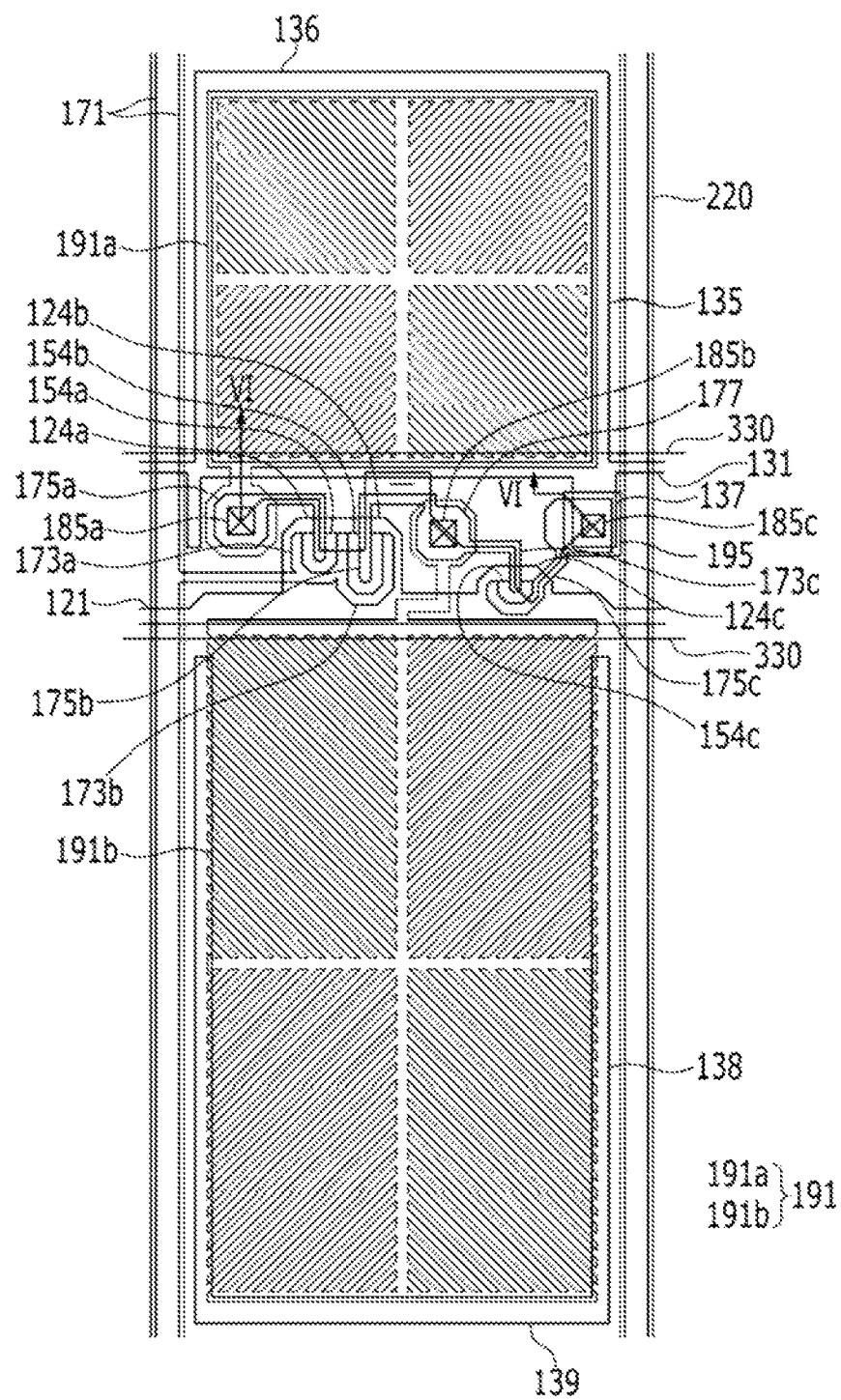
FIG. 4 is a layout view showing one pixel of a liquid crystal display according to an exemplary embodiment of the present invention.
Figure 5:
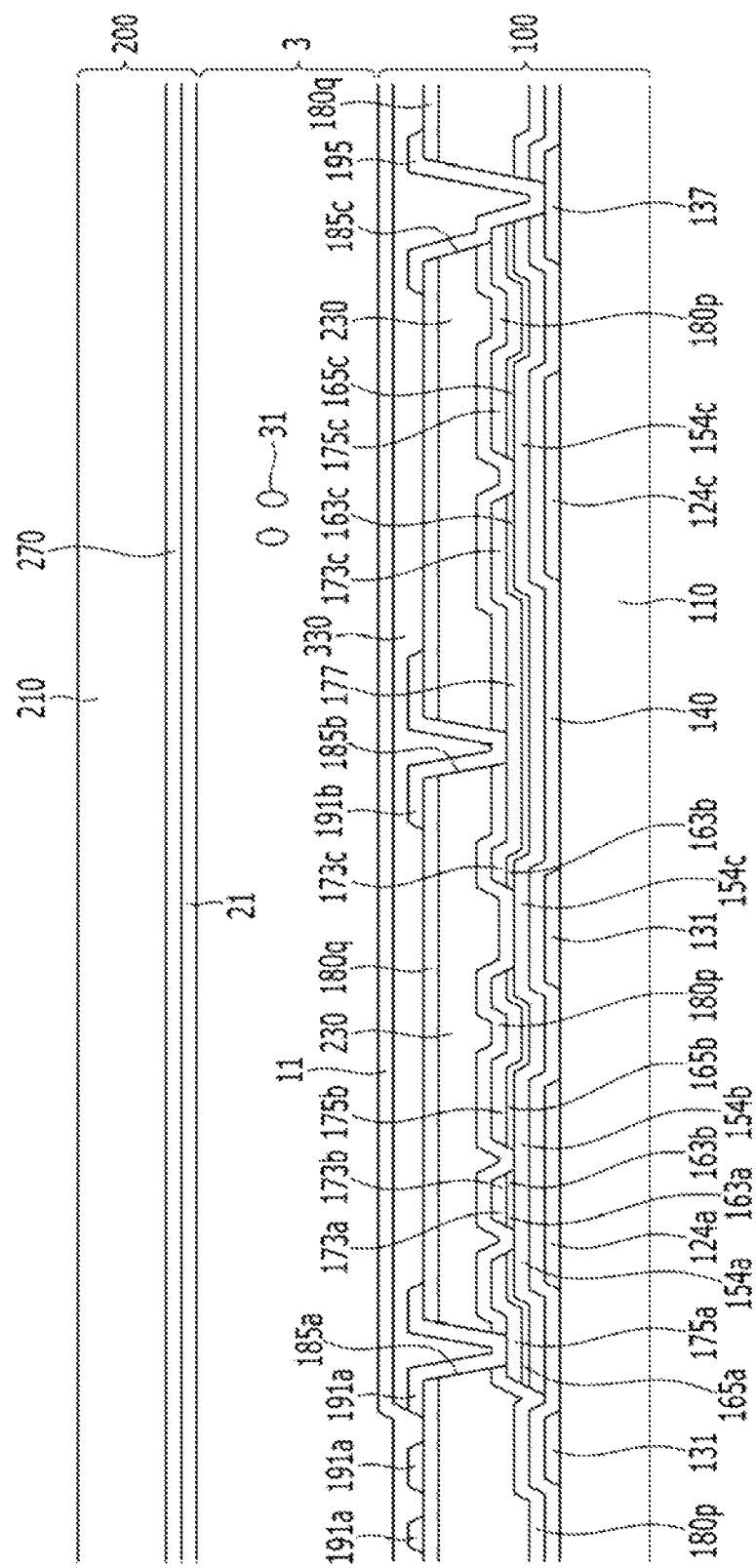
FIG. 5 is a cross-sectional view of one pixel taken along line VI-VI in FIG. 4.
Figure 6:
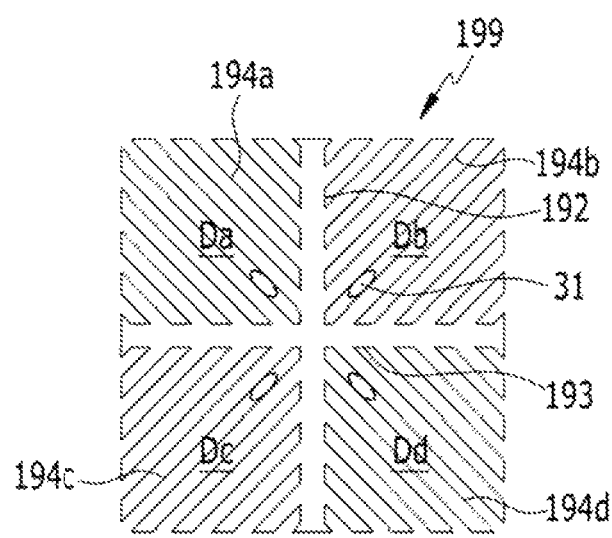
FIG. 6 is a top plan view showing a basic region of a pixel electrode of a liquid crystal display according to an exemplary embodiment of the present invention.

Then, referring to FIGS. 4 to 6, a structure of a liquid crystal display according to an exemplary embodiment of the present invention may be briefly described.

FIG. 4 is a layout view showing one pixel of a liquid crystal display according to an exemplary embodiment of the present invention, FIG. 5 is a cross-sectional view of one pixel taken along line VI-VI in FIG. 4, and FIG. 6 is a top plan view showing a basic region of a pixel electrode of a liquid crystal display according to an exemplary embodiment of the present invention.

First, referring to FIGS. 4 and 5, the liquid crystal display according to an exemplary embodiment of the present invention may include a lower display panel 100 and an upper display panel 200 facing each other, a liquid crystal layer 3 interposed between these two display panels 100 and 200, and a pair of polarizers (not-shown) attached on outer surfaces of the display panels 100 and 200.

First, a lower display panel 100 may be described.

A gate conductor including a gate line 121 and a divided reference voltage line 131 may be formed on an insulation substrate 110 made of a transparent glass, plastic, or the like.

The gate line 121 may include a first gate electrode 124$a$, a second gate electrode 124$b$, a third gate electrode 124$c$, and a wide end portion (not shown) for allowing a connection with other layers or external driving circuits.

The divided reference voltage line 131 may include first sustain electrodes 135 and 136 and a reference electrode 137. Second sustain electrodes 138 and 139 may not be connected to the divided reference voltage line 131 but overlapped with a second sub-pixel electrode 191$b$.

A gate insulating layer 140 may be positioned on the gate line 121 and the divided reference voltage line 131.

A first semiconductor 154$a$, a second semiconductor 154$b$ and a third semiconductor 154$c$ may be positioned on the gate insulating layer 140.

A plurality of ohmic contacts 163$a$, 165$a$, 163$b$, 165$b$, 163$c$, and 165$c$ may be positioned on the semiconductors 154$a$, 154$b$, and 154$c$.

Data conductors including a plurality of data lines 171 including a first source electrode 173$a$ and a second source electrode 173$b$, a first drain electrode 175$a$, a second drain electrode 175$b$, a third source electrode 173$c$, and a third drain electrode 175$c$ may be positioned on the ohmic contacts 163$a$, 165$a$, 163$b$, 165$b$, 163$c$, and 165$c$ and the gate insulating layer 140.

The data conductors and the semiconductors and the ohmic contacts positioned below may be simultaneously formed by one mask.

The data line 171 may include the wide end portion (not shown) for allowing a connection with other layers or external driving circuits.

The first gate electrode 124$a$, the first source electrode 173$a$, and the first drain electrode 175$a$ may form a first thin film transistor (TFT) Qa together with a first island-shaped semiconductor 154$a$, and a channel of the thin film transistor may be formed in the semiconductor 154a between the first source electrode 173a and the first drain electrode 175a. Similarly, the second gate electrode 124b, the second source electrode 173b, and the second drain electrode 175b may form a second thin film transistor Qb together with a second island-shaped semiconductor 154b, a channel of the thin film transistor may be formed in the semiconductor 154b between the second source electrode 173b and the second drain electrode 175b. Similarly, the third gate electrode 124c, the third source electrode 173c, and the third drain electrode 175c may form a third thin film transistor Qc together with a third island-shaped semiconductor 154c, and a channel of the thin film transistor may be formed in the semiconductor 154c between the third source electrode 173c and the third drain electrode 175c.

The second drain electrode 175b may be connected to the third source electrode 173c, and may include an expanding portion 177 which is widely expanded.

A first passivation layer 180p may be positioned on portions of the data conductors 171, 173c, 175a, 175b, and 175c, and exposed semiconductors 154a, 154b, and 154c. The first passivation layer 180p may include inorganic insulating layers such as silicon nitride, silicon oxide, or the like. The first passivation layer 180p may prevent inflow of the pigment of a color filter 230 into the exposed portion of the semiconductors 154a, 154b, and 154c.

The color filter 230 may be positioned on the first passivation layer 180p. The color filter 230 may extend in a vertical direction along two data lines adjacent to each other. A first light blocking member 220 may be positioned on the first passivation layer 180p, an edge of the color filter 230, and the data line 171.

The first light blocking member 220 may be positioned between the two adjacent color filters 230 while extending along the data line 171. A width of the first light blocking member 220 may be wider than that of the data line 171. By forming that a width of the first light blocking member 220 is wider than that of the data line 171 as described above, the first light blocking member 220 may prevent reflection of an incident light from the outside on a surface of the data line 171 which is a metal. Therefore, deterioration of a contrast ratio of the liquid crystal display by interfere of the light reflected on the surface of the data line 171 with light transmitting the liquid crystal layer 3 may be prevented.

A second passivation layer 180q may be positioned on the color filter 230 and the first light blocking member 220.

The second passivation layer 180q may include inorganic insulating layers such as silicon nitride, silicon oxide, or the like. The second passivation layer 180q may serve to prevent defect such as an afterimage which may be caused upon driving a screen by preventing the color filter 230 from being delaminated and suppressing contamination of the liquid crystal layer 3 by an organic material such as a solvent entered from the color filter 230.

A first contact hole 185a and a second contact hole 185b exposing the first drain electrode 175a and the second drain electrode 175b may be formed in the first passivation layer 180p and the second passivation layer 180q.

A third contact hole 185c exposing a portion of the reference electrode 137 and a portion of the third drain electrode 175c may be formed in the first passivation layer 180p and the second passivation layer 180q and the gate insulating layer 140, and the third contact hole 185c may be covered with a connecting member 195. The connecting member 195 may electrically connect the reference electrode 137 and the third drain electrode 175c exposed through the third contact hole 185c.

A plurality of pixel electrodes 191 may be positioned on the second passivation layer 180q. Each pixel electrode 191 may be separated with the gate line 121 therebetween, and may include a first sub-pixel electrode 191a and a second sub-pixel electrode 191b neighboring in a column direction based on the gate line 121. The pixel electrode 191 may be formed of a transparent conductive material such as ITO, IZO, or the like, or a reflexible metal such as aluminum, silver, chromium, alloys thereof, or the like.

The first sub-pixel electrode 191a and the second sub-pixel electrode 191b may include one or more of base electrode 199 shown in FIG. 6 and modifications thereof, respectively.

The first sub-pixel electrode 191a and the second sub-pixel electrode 191b may be physically and electrically connected to the first drain electrode 175a and the second drain electrode 175b through the first contact hole 185a and the second contact hole 185b, respectively, and may receive data voltage from the first drain electrode 175a and the second drain electrode 175b. Here, a portion of the data voltage applied to the second drain electrode 175b may be divided by the third source electrode 173c, such that a size of the voltage applied to the first sub-pixel electrode 191a may be larger than that of the voltage applied to the second sub-pixel electrode 191b.

The first sub-pixel electrode 191a and the second sub-pixel electrode 191b applied with the data voltage may generate an electric field together with the common electrode 270 of the upper display panel 200 to determine direction of the liquid crystal molecule of the liquid crystal layer 3 between the two electrodes 191 and 270. Luminance of light transmitting the liquid crystal layer 3 may be changed depending on the direction of the liquid crystal molecule determined as described above.

A second light blocking member 330 may be positioned on the pixel electrode 191. The second light blocking member 330 may be formed so as to cover the entire region in which the first thin film transistor Qa, the second thin film transistor Qb, the third thin film transistor(Qc), and the first to third contact holes 185a, 185b, and 185c may be positioned, and may extend in the same direction as the gate line 121 to be overlapped with the portion of the data line 171. At least one portion of the second light blocking member 330 may be overlapped with two data lines 171 positioned at both sides of one pixel area, thereby preventing light leakage which may be generated around the data line 171 and the gate line 121, and preventing light leakage at the region in which the first thin film transistor Qa, the second thin film transistor Qb, and the third thin film transistor Qc may be positioned.

Before the second light blocking member 330 is formed, the first passivation layer 180p, the color filter 230, and the second passivation layer 180q may be positioned in the region in which the first thin film transistor Qa, the second thin film transistor Qb, the third thin film transistor(Qc), and the first to third contact holes 185a, 185b, and 185c may be positioned, such that each position of the first thin film transistor Qa, the second thin film transistor Qb, the third thin film transistor Qc, and the first to third contact holes 185a, 185b, and 185c may be easily classified.

A first alignment layer 11 may be positioned on the second light blocking member 330. As described above, the first alignment layer 11 may include the polyolefin-based compound represented by the following Chemical Formula 1, and the side chains in addition to the backbone 12 may include the vertical functional group 13 and the photoreactors 14 connected to the vertical functional group 13.

[Chemical Formula 1]

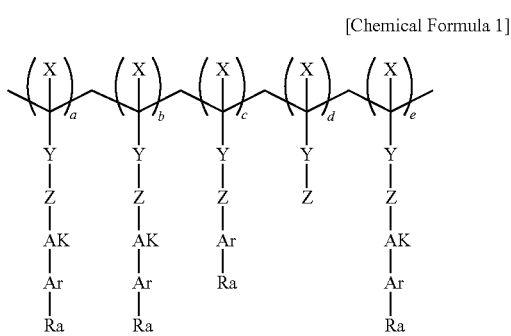

In Chemical Formula 1, X may independently include at least one of H and —CH$_3$, Y may independently include at least one of

O, and

Z may independently include at least one of OH, O,

OCH$_3$, and O(CH)$_n$CH$_3$, AK may independently include at least one of (CH$_2$)$_n$O,

and (CH$_2$)$_n$CH$_2$, Ar may independently include at least one of

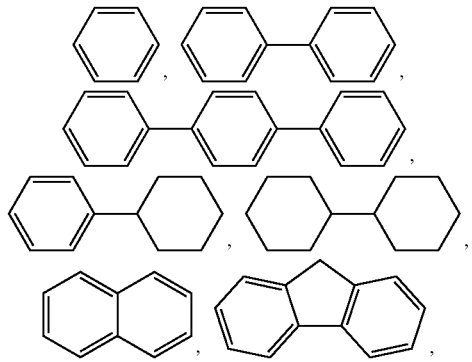

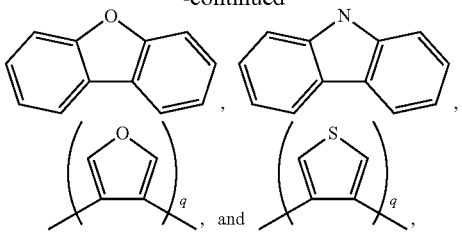

and Ra may independently include at least one of

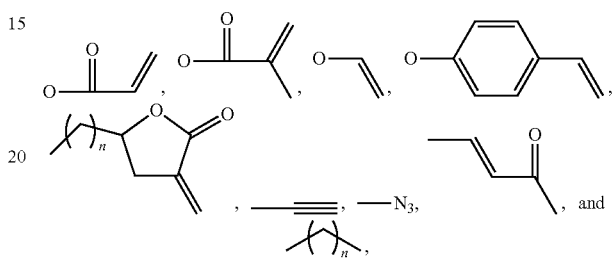

a, b, c, d and e, which represent a component ratio of repeating units, may have a value of 0 to 100%, respectively, and when expressing a, b, c, d and e as a ratio rather than a percentage, the sum total may be 1, and each has a value of 0 to 1. n may be any one of 0 to 20, and q may be any one of 1 to 4.

According to one embodiment of the present invention, a and b may be 10%, respectively, c may be 40%, d may be 20%, and e may be 20%, but the present invention is not limited thereto.

The compound represented by Chemical Formula 1 by the above-described combination may be a compound represented by the following Chemical Formula 2:

[Chemical Formula 2]

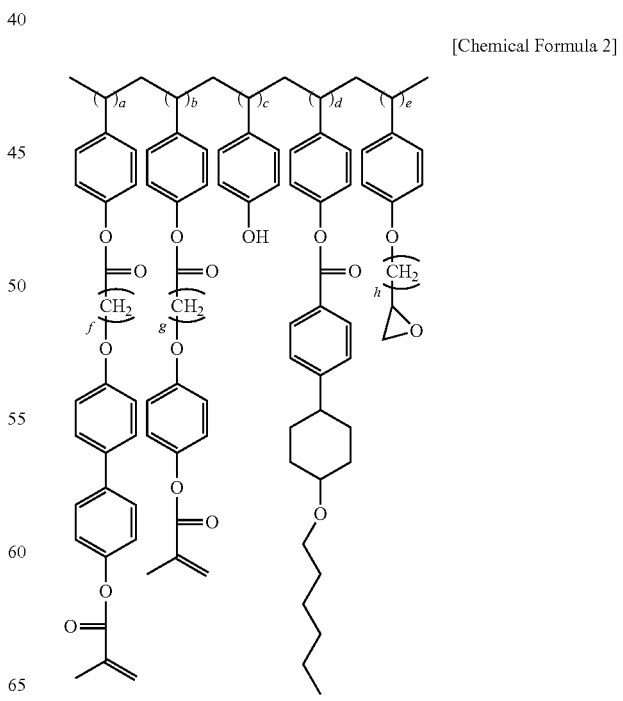

In Chemical Formula 2, a, b, c, d and e, which represent a component ratio of repeating units, may have a value of 0 to 100%, respectively, and when expressing a, b, c, d and e as a ratio rather than a percentage, the sum total may be 1, and each has a value of 0 to 1. In addition, f and g may be 4 to 8, and h may be 1 to 5.

According to one embodiment of the present invention, a and b may be 10%, respectively, c may be 40%, d may be 20%, and e may be 20%, but the present invention is not limited thereto.

The compound represented by Chemical Formula 2 may be formed by the following Reaction Formula 1

[Reaction Formula 1]

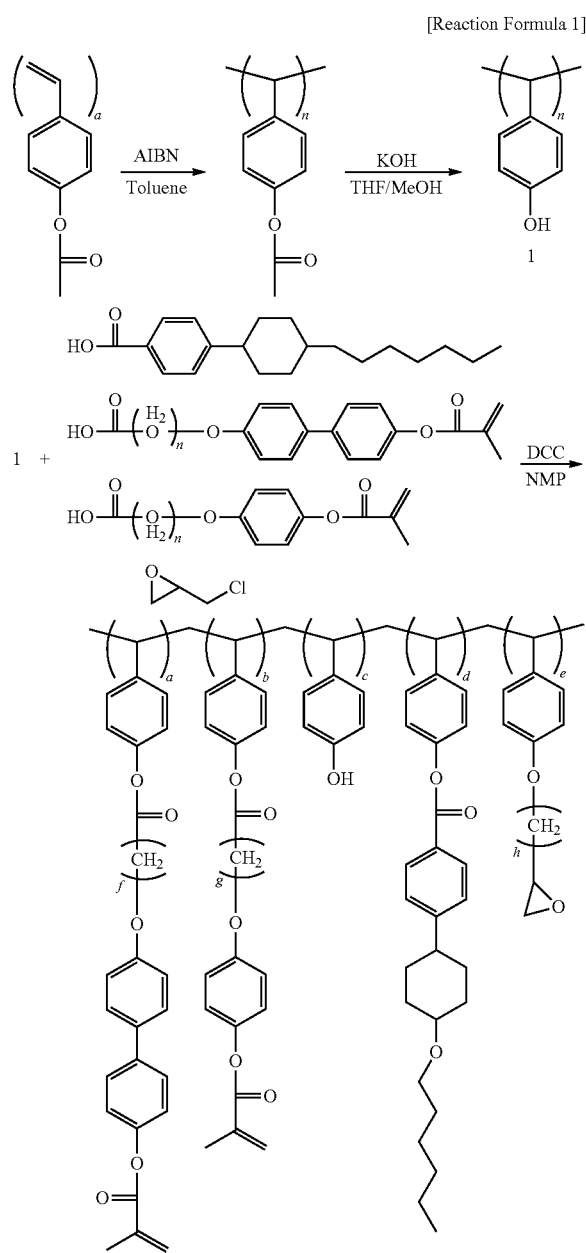

In the Reaction Formula 1, a, b, c, d and e, which represent a component ratio of repeating units, may have a value of 0 to 100%, respectively, and when expressing a, b, c, d and e as a ratio rather than a percentage, the sum total may be 1, and each has a value of 0 to 1. f and g may be 4 to 8, and h may be 1 to 5.

According to one embodiment of the present invention, a and b may be 10%, respectively, c may be 40%, d may be 20%, and e may be 20%, but the present invention is not limited thereto.

When considering main role of each portion in the compounds represented by Chemical Formulae 1 and 2, a first side chain portion and a second side chain portion in sequence from left in the compounds represented by Chemical Formulae 1 and 2, which are components corresponding to the reactive monomer, may serve to control a pretilt of the liquid crystal by photopolymerization, and a third side chain portion in the compounds represented by Chemical Formulae 1 and 2 may serve to improve a cross-linkage reaction and solubility, and a fourth side chain portion in the compounds represented by Chemical Formulae 1 and 2, which is a vertical alignment component, may serve to induce vertical alignment of the liquid crystal, and a fifth side chain portion in the compounds represented by Chemical Formulae 1 and 2 may serve as a cross-linkage reaction.

When the polyolefin-based compound represented by Chemical Formulae 1 and 2 are used in the alignment layers 11 and 21, a molecular weight may be increased and a polymerization reaction may be easily performed as compared to a polyimide-based compound generally used in alignment layers, and therefore, various side chains may be capable of being introduced, thereby increasing density of the side chains of the alignment layers 11 and 21 approximately two times. Therefore, the alignment layers 11 and 21 may have high molecular weight and density and cross-linking groups may be easily introduced into the alignment layers 11 and 12, such that mechanical properties of the alignment layers 11 and 12 may be improved. In addition, due to the improvement of mechanical properties, the black image sticking and the image sticking of the liquid crystal liquid display to which the alignment layers according to an exemplary embodiment of the present invention are applied may be improved.

Now, the upper display panel 200 may be described.

A common electrode 270 may be formed on an insulation substrate 210. A second alignment layer 21 may be formed on the common electrode 270. The second alignment layer 21 may be a vertical alignment layer, and may be the same as the above-described first alignment layer 11. Since description of the second alignment layer 21 may be the same as the above-description of the first alignment layer 11, the detailed description thereof will be omitted.

The liquid crystal layer 3 may have a negative dielectric anisotropy, and the liquid crystal molecules of the liquid crystal layer 3 may be aligned so that a major axis thereof may be vertical to the surfaces of two display panels 100 and 200 in a state without an electric field.

Next, referring to FIG. 6, a basic electrode 199 may be described.

As shown in FIG. 6, the basic electrode 199 may have the entire shape of quadrangle, and may include a cross stem portion including a horizontal stem portion 193 and a vertical stem portion 192 orthogonal to the horizontal stem portion. In addition, the basic electrode 199 may include a first sub-region (Da), a second sub-region (Db), a third sub-region (Dc), and a fourth sub-region (Dd) which are classified based on the horizontal stem portion 193 and the vertical stem portion 192, and each sub-region (Da to Dd) may include a plurality of first fine branched portions 194a, a plurality of second fine branched portions 194b, a plurality of third fine branched portions 194c, and a plurality of fourth fine branched portions 194d.

The first fine branched portions 194a may be obliquely extended in a left upper direction from the horizontal stem portion 193 or the vertical stem portion 192, and the second fine branched portions 194b may be obliquely extended in a right upper direction from the horizontal stem portion 193 or the vertical stem portion 192. In addition, the third fine branched portions 194c may be obliquely extended in a left lower direction from the horizontal stem portion 193 or the vertical stem portion 192, and the fourth fine branched portions 194d may be obliquely extended in a right lower direction from the horizontal stem portion 193 or the vertical stem portion 192.

The first to fourth fine branched portions 194a, 194b, 194c and 194d may form an angle of approximately 45 or 135 degrees with the gate line 121a and 121b or the horizontal stem portion 193. In addition, the fine branched portions 194a, 194b, 194c, and 194d of the neighboring two sub-regions (Da, Db, Dc, and Dd) may be orthogonal to each other.

The fine branched portions 194a, 194b, 194c, and 194d may have a width of 2.5 μm to 5.0 μm, and the neighboring fine branched portions 194a, 194b, 194c, and 194d in one sub-region Da, Db, Dc and Dd may have an interval of 2.5 μm to 5.0 μm therebetween.

According to another exemplary embodiment of the present invention, the width of the fine branched portions 194a, 194b, 194c, and 194d may become wider as the fine branched portions 194a, 194b, 194c, and 194d may be closed to the horizontal stem portion 193 or the vertical stem portion 192, and a difference between the maximum width and the minimum width in one fine branched portion 194a, 194b, 194c, and 194d may be 0.2 μm to 1.5 μm.

The first sub-pixel electrode 191a and the second sub-pixel electrode 191b may be connected to the first drain electrode 175a and the second drain electrode 175b through the first contact hole 185a and the second contact hole 185b, respectively, and may receive data voltage from the first drain electrode 175a and the second drain electrode 175b. Here, edges of the first to fourth fine branched portions 194a, 194b, 194c, and 194d may generate horizontal components determining a tilt direction of the liquid crystal molecules 31 by distorting an electric field. The horizontal components of the electric field may be nearly horizontal to the edges of the first to fourth fine branched portions 194a, 194b, 194c, and 194d. Therefore, as shown in FIG. 6, the liquid crystal molecules 31 may be tilted in a direction parallel to a length direction of the fine branched portions 194a, 194b, 194c, and 194d. Since one pixel electrode 191 includes four sub-regions (Da to Dd) in which length directions of the fine branched portions 194a, 194b, 194c, and 194d, are different from each other, there may be approximately four directions in which the liquid crystal molecules 31 are tilted, and four different domains each having different alignment direction of the liquid crystal molecules 31 may be formed in the liquid crystal layer 3. When direction in which the liquid crystal molecules are tilted is varied as described above, a reference viewing angle of the liquid crystal display may become increased.

In the liquid crystal display according to an exemplary embodiment of the present invention, the liquid crystal alignment layer including a polyolefin-based compound as the backbone may be formed, such that mechanical properties and afterimage of the alignment layer may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An alignment layer comprising:
a backbone including a polyolefin-based compound, and a plurality of side chains connected to the backbone, wherein
the backbone and the plurality of side chains comprise a compound represented by the following Chemical Formula 1:

[Chemical Formula 1]

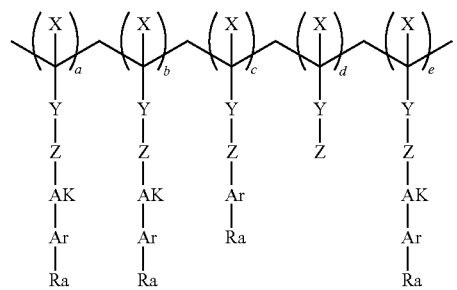

in Chemical Formula 1, X independently comprises at least one of H and —CH$_3$, Y independently comprises at least one of

or O, Z independently comprises at least one of OH, O,

OCH$_3$, and O(CH)$_n$CH$_3$, AK independently comprises at least one of (CH$_2$)$_n$O,

and (CH$_2$)$_n$CH$_2$, Ar independently comprises at least one of

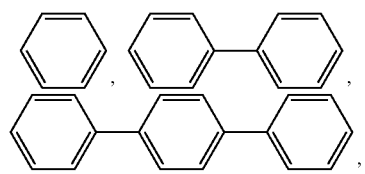

-continued

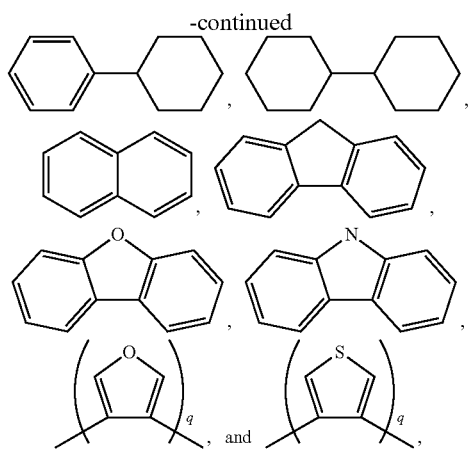

Ra independently comprises at least one of

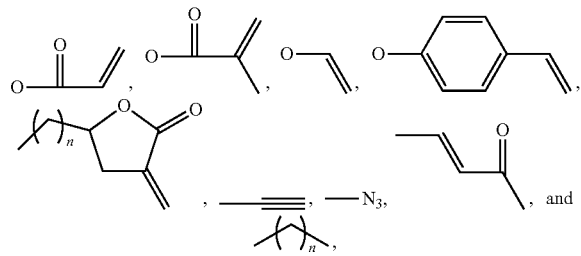

n is 0 to 20, and q is 1 to 4, and a, b, c, d and e represent a component ratio of repeating units respectively, and have a value of 0 to 100% respectively, the sum of the component ratio of a, b, c, d and e is 100%.

2. The alignment layer of claim 1, wherein the compound represented by Chemical Formula 1 is a compound represented by the following Chemical Formula 2:

[Chemical Formula 2]

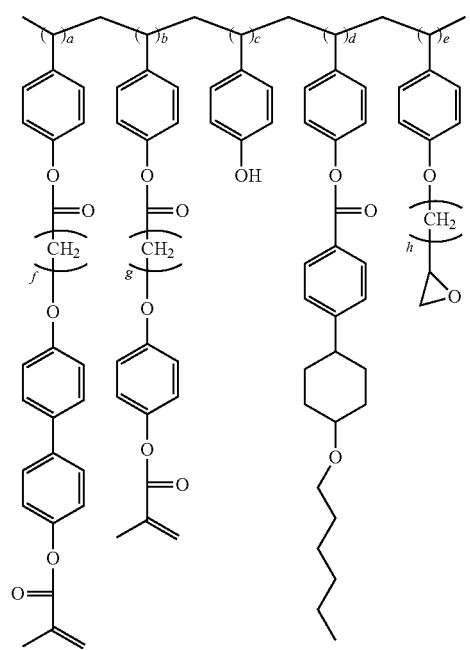

in Chemical Formula 2, f and g are 4 to 8, and h is 1 to 5, and a, b, c, d and e are the same as defined in claim 1.

3. The alignment layer of claim 2, wherein a and b are 0.1, respectively, c is 0.4, d is 0.2, and e is 0.2.

4. A method of manufacturing an alignment layer, the method comprising:
forming the alignment layer on at least one of a first substrate and a second substrate facing each other and including an electric field generating electrode; and
injecting a liquid crystal layer between the first substrate and the second substrate, wherein
the alignment layer is manufactured by the following Reaction Formula 1:

[Reaction Formula 1]

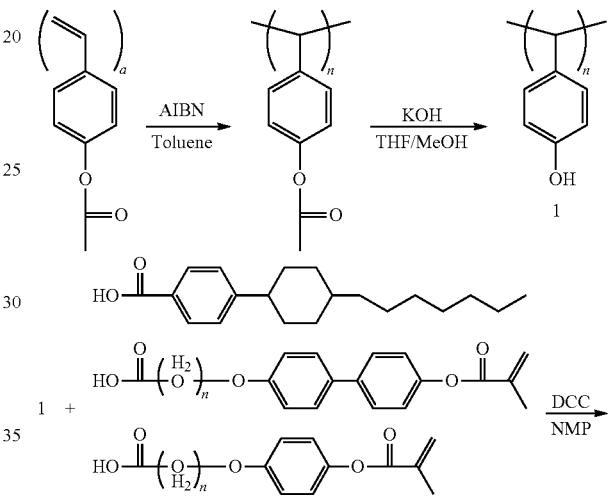

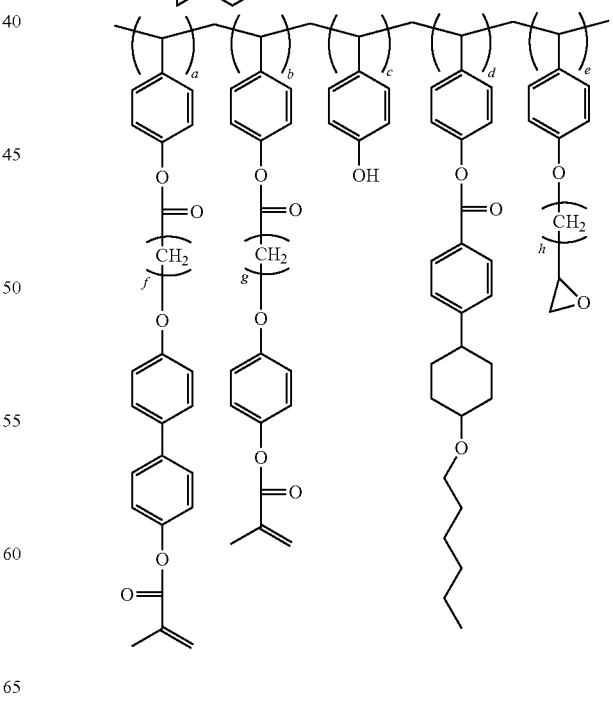

in Reaction Formula 1, f and g are 4 to 8, and h is 1 to 5, and a, b, c, d and e are the same as defined in claim 1.

5. The method of claim 4, further comprising:

applying a voltage to the electric field generating electrode after the injecting of the liquid crystal layer; and irradiating light to the first substrate and the second substrate.

6. The method of claim 5, wherein a and b are 0.1, respectively, c is 0.4, d is 0.2, and e is 0.2.

7. A liquid crystal display comprising:

a first substrate, a second substrate facing the first substrate;

a pixel electrode positioned on the first substrate;

a common electrode positioned on the first substrate or the second substrate;

a first alignment layer positioned on the first substrate;

a second alignment layer positioned on the second substrate; and a liquid crystal layer positioned between the first substrate and the second substrate, wherein at least one of the first alignment layer and the second alignment layer comprises an alignment polymer, and the alignment polymer is formed from an alignment agent including a backbone including a polyolefin-based compound and side chains connected to the backbone, wherein the side chains comprise a vertical functional group and a reactive mesogen (RM); and the alignment agent comprises a compound represented by the following Chemical Formula 1:

[Chemical Formula 1]

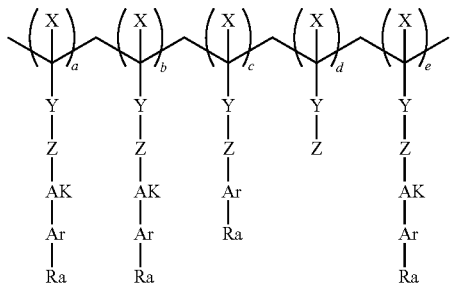

in Chemical Formula 1, X independently comprises at least one of H and —CH$_3$, Y independently comprises at least one of

, or O, Z independently comprises at least one of OH, O,

OCH$_3$, and O(CH)$_n$CH$_3$, AK independently comprises at least one of (CH$_2$)$_n$O,

and (CH$_2$)$_n$CH$_2$, Ar independently comprises at least one of

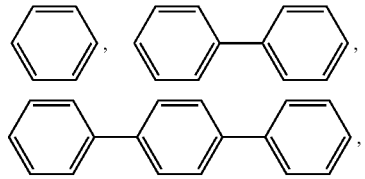

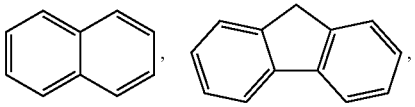

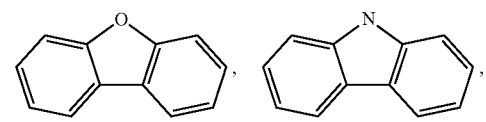

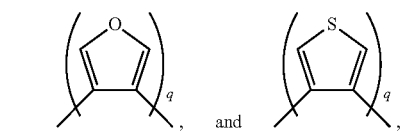

Ra independently comprises at least one of

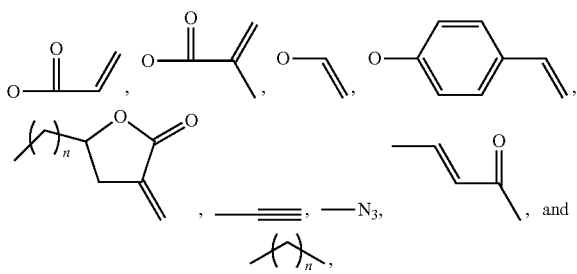

is 0 to 20, and q is 1 to 4, and a, b, c, d and e represent a component ratio of repeating units respectively, and have a value of 0 to 100% respectively, the sum of the component ratio of a, b, c, d and e is 100%.

8. The liquid crystal display of claim 7, wherein the compound represented by Chemical Formula 1 is a compound represented by the following Chemical Formula 2:

[Chemical Formula 2]

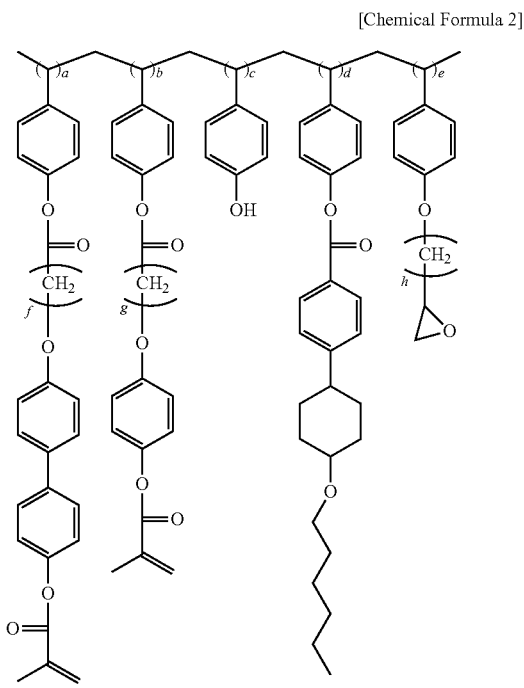

in Chemical Formula 2, f and g are 6, and h is 3, and a, b, c, d and e are the same as defined in claim 7.

9. The liquid crystal display of claim 8, wherein a and b are 0.1, respectively, c is 0.4, d is 0.2, and e is 0.2.

10. The liquid crystal display of claim 7, wherein liquid crystal molecules of the liquid crystal layer have a pretilt formed by the first alignment layer and the second alignment layer.

11. A method of manufacturing a liquid crystal display, the method comprising:
    forming a pixel electrode on a first substrate;
    forming a common electrode on the first substrate or a second substrate facing the first substrate; and
    forming a first alignment layer on the first substrate and a second alignment layer on the second substrate, respectively,
    wherein at least one of the first alignment layer and the second alignment layer is manufactured by the following Reaction Formula 1:

[Reaction Formula 1]

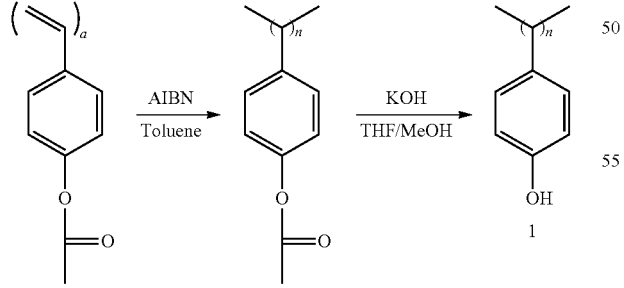

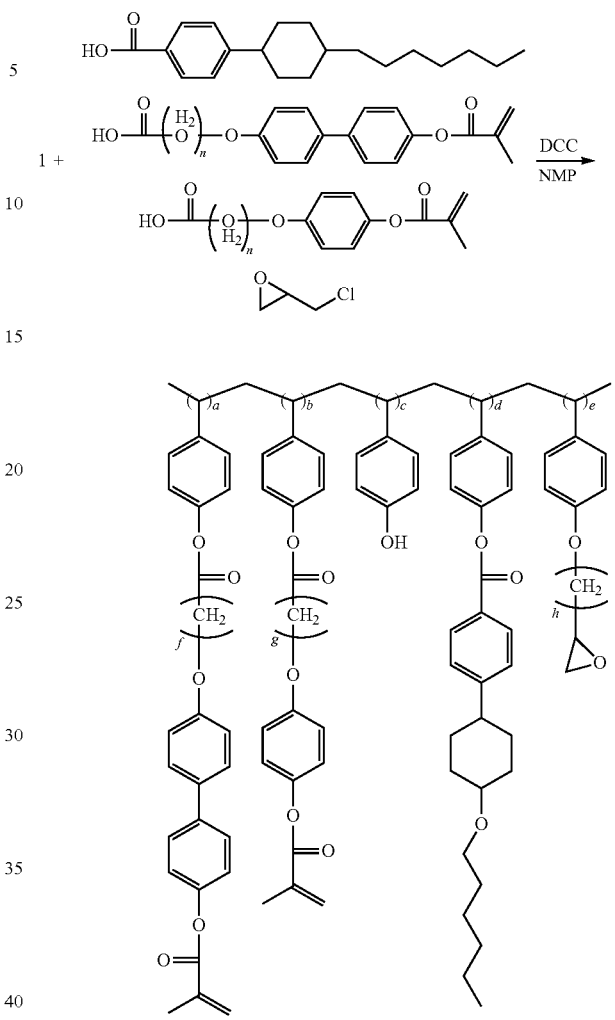

in Reaction Formula 1, f and g are 4 to 8, and h is 1 to 5, and a, b, c, d and e are the same as defined in claim 7.

12. The method of claim 11, further comprising:
    injecting a liquid crystal layer between the first substrate and the second substrate after forming of the alignment layers;
    applying a voltage to an electric field generating electrode; and
    irradiating light to the first substrate and the second substrate.

13. The method of claim 12, wherein a and b are 0.1, respectively, c is 0.4, d is 0.2, and e is 0.2.

* * * * *